US007313678B2

(12) United States Patent
Zhang et al.

(10) Patent No.: US 7,313,678 B2
(45) Date of Patent: Dec. 25, 2007

(54) INSTALLATION PROCEDURE FOR WIRELESS HUMAN INTERFACE DEVICE

(75) Inventors: Tong Zhang, San Diego, CA (US); Yuqian C. Wong, San Diego, CA (US)

(73) Assignee: Broadcom Corporation, Irvine, CA (US)

(*) Notice: Subject to any disclaimer, the term of this patent is extended or adjusted under 35 U.S.C. 154(b) by 147 days.

(21) Appl. No.: 10/609,060

(22) Filed: Jun. 28, 2003

(65) Prior Publication Data

US 2004/0177132 A1 Sep. 9, 2004

Related U.S. Application Data

(60) Provisional application No. 60/454,294, filed on Mar. 13, 2003, provisional application No. 60/452,251, filed on Mar. 5, 2003.

(51) Int. Cl.
*G06F 15/177* (2006.01)
*G06F 13/00* (2006.01)
*G06F 3/00* (2006.01)

(52) U.S. Cl. .................... 713/1; 713/2; 710/8; 710/10; 710/62; 710/64; 710/72; 710/73; 370/310

(58) Field of Classification Search .................... 710/8, 710/10, 62–64, 72–73; 713/1, 2, 100; 370/310
See application file for complete search history.

(56) References Cited

U.S. PATENT DOCUMENTS

| | | | | |
|---|---|---|---|---|
| 5,848,064 | A * | 12/1998 | Cowan | 370/338 |
| 5,854,621 | A * | 12/1998 | Junod et al. | 345/158 |
| 5,949,777 | A * | 9/1999 | Uyesugi et al. | 370/345 |
| 6,519,290 | B1 * | 2/2003 | Green | 375/259 |
| 6,560,641 | B1 * | 5/2003 | Powderly et al. | 709/219 |
| 6,728,662 | B2 * | 4/2004 | Frost et al. | 702/188 |
| 6,782,245 | B1 * | 8/2004 | Lazzarotto et al. | 455/226.1 |
| 2003/0045236 | A1 * | 3/2003 | Chang et al. | 455/41 |

* cited by examiner

*Primary Examiner*—Tanh Q Nguyen
(74) *Attorney, Agent, or Firm*—Garlick Harrison & Markison; Bruce E. Garlick; Kevin L. Smith

(57) ABSTRACT

A host-side wireless interface services communications between a wireless user input device and a serviced host. The host-side wireless interface includes a wireless network interface, a host-side wireless interface, and may include additional components. The wireless network interface wirelessly communicates with the wireless user input device. The wireless user input device and the serviced host computer interact to setup the operation of the wireless user input device with the serviced host computer without requiring input from another user input device. In setting up the wireless user input device, the host-side wireless interface storing configuration information in non-volatile memory.

14 Claims, 16 Drawing Sheets

100
502
504
CASE
N
512
VIDEO I/F
510
PROC. I/F
514
SERIAL I/O
516
PARALLEL I/O
518
PCI I/F
520
HOST-SIDE WIRELESS I/F
530
506
PROCESSOR
508
MEMORY
528
STORAGE
522
USB I/F
524
HOST-SIDE WIRELESS I/F
526

INSTALLATION PROCEDURE FOR WIRELESS HUMAN INTERFACE DEVICE

CROSS REFERENCE TO RELATED APPLICATION

This application claims priority to U.S. Provisional Application Ser. No. 60/452,251, filed Mar. 5, 2003, and to U.S. Provisional Application Ser. No. 60/454,294, filed Mar. 13, 2003, the disclosure of each of which is incorporated herein by reference in its entirety for all purposes.

BACKGROUND

1. Technical Field

The present invention relates generally to digital computers; and more particularly to wireless interface devices coupled to digital computers.

2. Related Art

Digital computers have been known in the art for years. Personal digital computers typically include a case, a video display, and one or more input/output devices. The case typically includes a power supply, a cooling fan, a motherboard, interface ports, peripheral cards, a disk drive, and other components. Contained on the motherboard are a processor, memory, a processor chip set, and one or more peripheral buses. The peripheral cards interface input/output devices with the motherboard via the peripheral buses. Other input/output devices may couple directly to the motherboard via appropriate connectors, e.g., devices coupled via a parallel port, devices coupled via a serial port, and devices coupled via a USB.

Input devices receive input from a user or another source while output devices provide output to a user or another destination. Wireless keyboards, computer mice, microphones, scanners, etc. are typically considered input devices because they receive input but provide no output. Monitors, speakers, printers, etc. are considered output devices because they provide output to the user but receive no input from the user. Other devices, such as touch sensitive monitors, that both receive input and produce output are considered to be both input and output devices.

Wireless communication technology has rapidly advanced over the past few years. Resultantly, computer input/output devices are now being called upon to wirelessly communicate with their "host" computers. Wireless keyboards and mice now couple via wireless connections to their host computers. These "wireless" input devices provide great benefits in that they require no wired connections with their host computers.

Various operational difficulties may arise, however, in using a wireless user input device in place of a wired input device. One particular problem arises during power-up or reset in which the host computer is booted. When the host computer is boot strapped (boot or booted) it first executes a Basic Input Output System (BIOS) that is typically retrieved from static memory. The BIOS performs a status check on the host computer and then, once the status check is completed, initiates loading of an Operating System (OS) that is contained on a hard disk, CD ROM, or other storage device. However, the BIOS has limited ability to recognize peripheral devices. Currently, most, if not all BIOSs do not support wireless user input devices. To access the BIOS of the host computer or to cause the OS to enter a non-standard mode of operation requires input from a wireless keyboard. Further, interaction with the BIOS may also require or allow input from a wireless mouse. Thus, in order to perform these operations, a user must temporarily employ a wired wireless keyboard and/or a wired wireless mouse. Such additional difficulty in connecting and using the wired wireless keyboard and/or wired wireless mouse is unwieldy and may cause the user to give up his or her wireless user input device.

Another problem relating to wireless user input devices is encountered during their setup. Prior wireless user input devices required that a wired input device be employed to interact with the wirelessly enabled host computer during the setup of the wireless user input device. When wireless user input devices were paired with the wirelessly enabled host computer prior to delivery, the manufacturer/seller of the system that included the wireless user input devices and the wirelessly enabled host computer employed a wired input device for setup. However, when an end user of the wireless user input device purchased the wireless user input device, the end user was required to temporarily employ a wired input device for the setup of the wireless user input device.

Thus, there is a need in the art for a solution to the problem of setting up user inputs devices without the use of a wired input device.

SUMMARY OF THE INVENTION

Thus in order to overcome the shortcomings of the prior devices among other shortcomings, a wireless user input device and a serviced host computer interact to setup the operation of the wireless user input device with the serviced host computer without requiring input from another user input device. The wireless user input device may be a wireless keyboard, a wireless mouse, a wireless camera, a wireless game controller, or another wireless user input device. The serviced host computer includes a host-side wireless interface that wirelessly communicates with the wireless user input device.

A method of operation according to the present invention includes configuring a wireless user input device and a wirelessly enabled host computer so that the wirelessly enabled host receives user input from the wireless user input device. The method of the present invention performs such configuration operations without requiring any input other than from the wireless user input device. A first operation according to the method is powering the wireless user input device. With the wireless user input device powered, based upon receipt of a configuration input from a user of the wireless user input device, the wireless user input device enters a discovery mode.

Then, with the wireless user input device in the discovery mode, the method includes powering the wirelessly enabled host computer. A host-side wireless interface of the wirelessly enabled host computer enters an automatic inquiry mode upon power up. The host-side wireless interface of the wirelessly enabled host computer then discovers the wireless user input device. The host-side wireless interface of the wirelessly enabled host computer next sends a Remote Name Request to the wireless user input device. Based upon receipt of a Remote Name Request response input from the user, the wireless user input device responds to the host-side wireless interface of the wirelessly enabled host computer with a Remote Name Request Response identifying the wireless user input device. Finally, the wirelessly enabled host computer performs configuration operations based upon the Remote Name Request Response.

In a typical setup operation, performing configuration operations based upon the Remote Name Request Response includes giving priority to the wireless user input device based upon a name of the wireless user input device contained in the Remote Name Request Response. Further, after computer performing configuration operations based upon the Remote Name Request Response, a formal device setup procedure is performed in which the wirelessly enabled host computer performs authentication operations on the wireless user input-device.

According to the present invention, the wirelessly enabled host computer and the wireless user input device communicate according to at least one version of the Bluetooth operating standard. In this manner, the wireless user input device may be a wirelessly enabled wireless mouse operating according to at least one version of the Bluetooth operating standard. Alternately, the wireless user input device may be a wirelessly enabled wireless keyboard operating according to at least one version of the Bluetooth operating standard.

Moreover, other aspects of the present invention will become apparent with further reference to the drawings and specification, which follow.

DETAILED DESCRIPTION OF THE DRAWINGS

Figure 1:
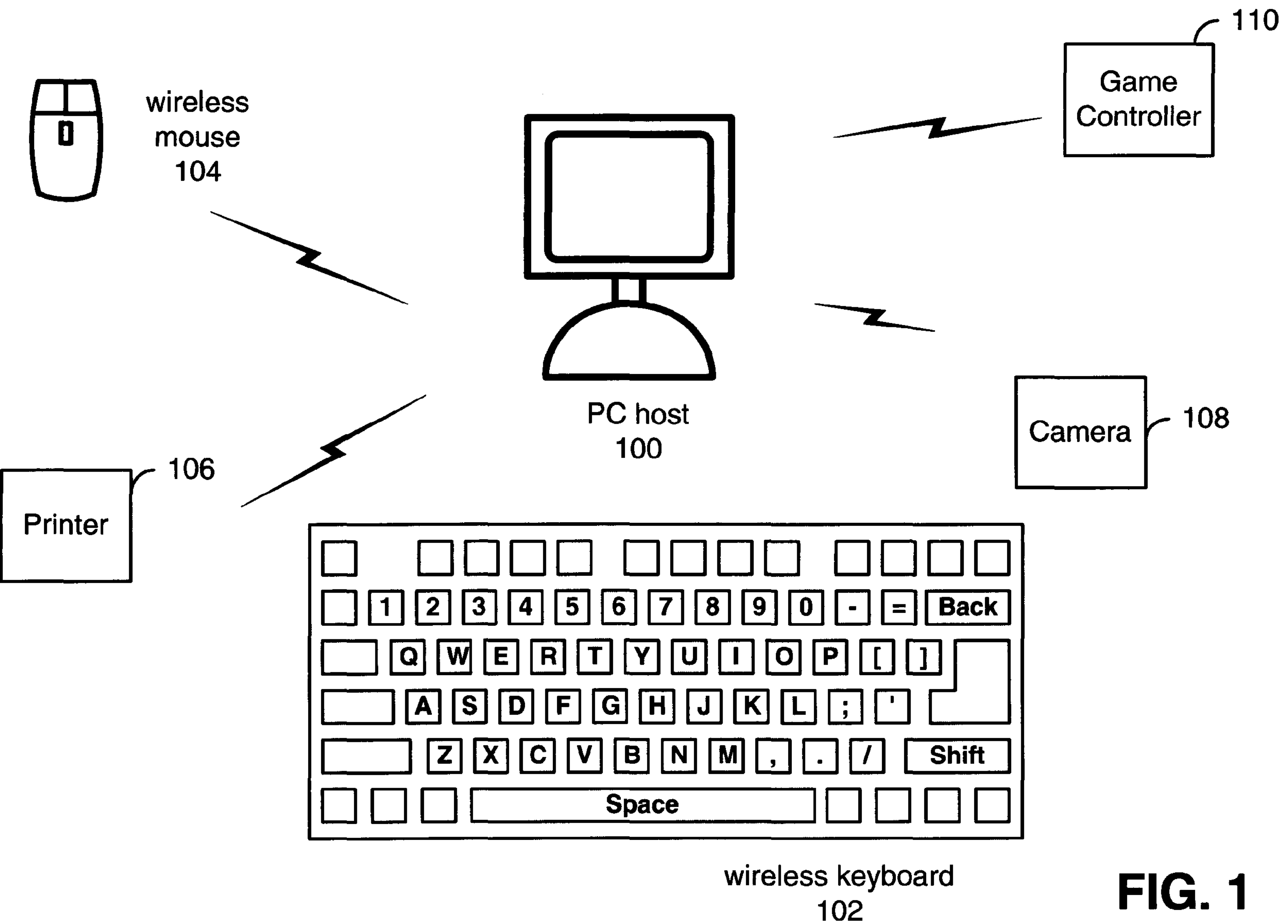
FIG. 1 is a system diagram illustrating a PC host, a wireless keyboard, a wireless mouse, a wirelessly enabled printer, a wirelessly enabled camera, and a wirelessly enabled game controller, each of which includes a wireless interface device constructed according to, and operating according to the present invention.

FIG. 1 is a system diagram illustrating a PC host 100, a wireless keyboard 102, a wireless mouse 104, a wirelessly enabled printer 106, a wirelessly enabled camera 108, and a wirelessly enabled game controller 110, each of which includes a wireless interface device constructed according to, and operating according to the present invention. The PC host 100 wirelessly couples to the wireless keyboard 102, a wireless mouse 104, a wirelessly enabled printer 106, a wirelessly enabled camera 108, and a wirelessly enabled game controller 110. According to the present invention, the PC host 100, the wireless keyboard 102, the wireless mouse 104, the wirelessly enabled printer 106, the wirelessly enabled camera 108, and the wirelessly enabled game controller 110 support user input operations when the PC host 100 is either in a Basic Input Output System (BIOS) mode of operation or when in an Operating System (OS) mode of operation. Further, according to the present invention, the PC host 100, the wireless keyboard 102, the wireless mouse 104, the wirelessly enabled printer 106, the wirelessly enabled camera 108, and the wirelessly enabled game controller 110 perform unique operations during first time setup to ensure that the devices will robustly pair with one another and so that they will robustly operate during subsequent input operations.

The PC host 100 will be referred to later herein as a "wirelessly enabled host", a serviced host, a host computer, a computer host, etc. As will be described further with reference to FIG. 5, the PC host 100 includes a host-side wireless interface that supports a wireless networking standard such as the Bluetooth Standard, the 802.15 standard, or another wireless standard.

Figure 2:
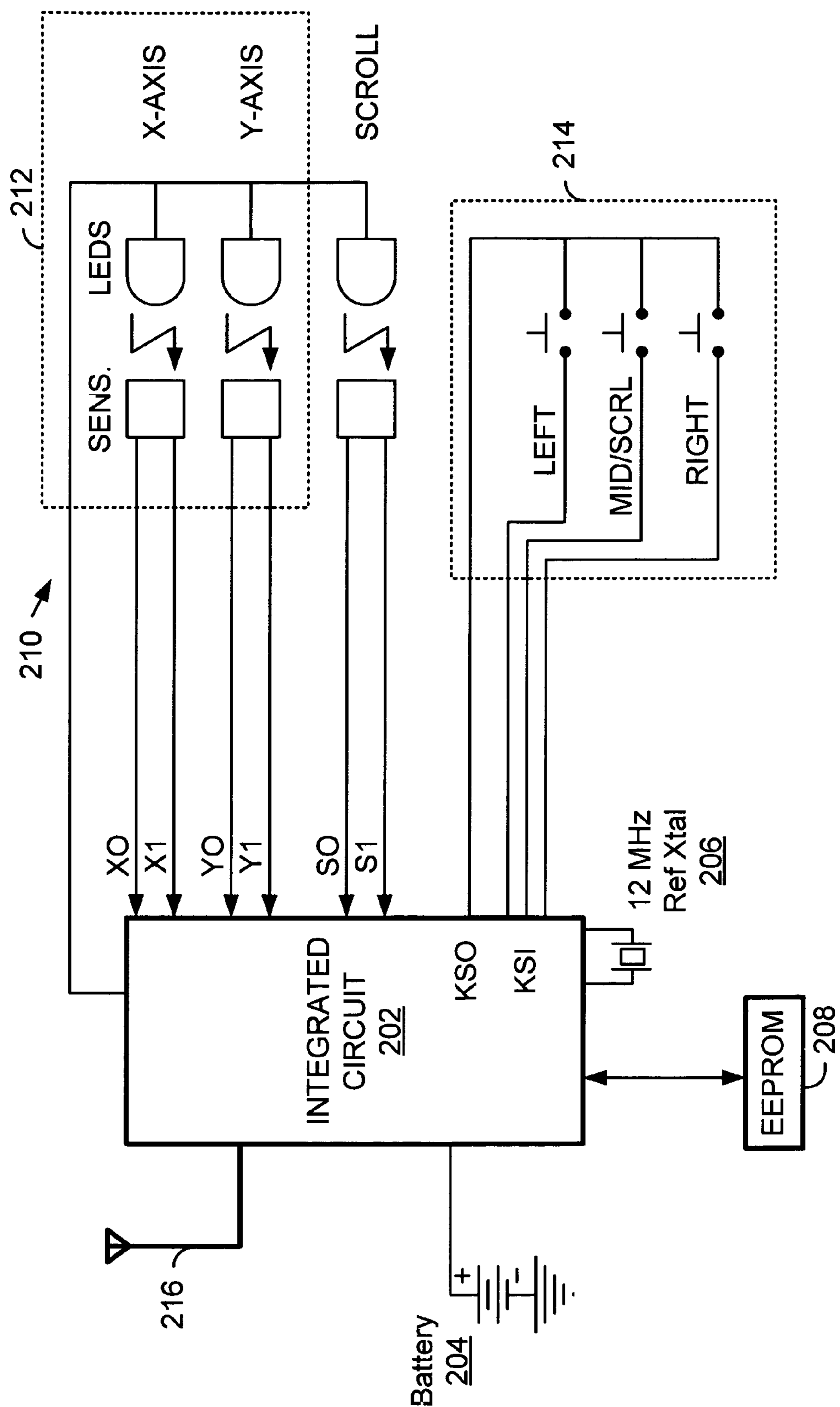
FIG. 2 is a schematic block diagram illustrating the structure of a wireless mouse that includes a wireless interface device constructed according to the present invention.

FIG. 2 is a schematic block diagram illustrating the structure of a wireless mouse 104 that includes a wireless interface device constructed according to the present invention. An integrated circuit 202 constructed according to the present invention serves as the wireless interface device and couples to various wireless mouse inputs 210. These wireless mouse inputs 210 include x-axis and y-axis inputs as well as a scroll input. The x-axis and y-axis inputs are often referred to a "quadrature" inputs. The components that produce the quadrature inputs are generally referred to at numeral 212 and may be constructed from optical inputs instead of from conventional mechanical inputs. Referenced via numeral 214 are the button inputs that are typical with a wireless mouse and include the left button input, the middle/scroll button input, and the right button input. As is shown, each of the signals produced by the wireless mouse are received by integrated circuit 202.

Integrated circuit 202 also couples to battery 204, crystal 206 that produces a reference frequency, e.g., 12 MHz, EEPROM 208, and antenna 216. In one embodiment of the present invention, battery 204 comprises a pair of either AA batteries or AAA batteries. Antenna 216 is an internal antenna in the described because of the size constraints of the wireless mouse and because of the relatively short distance between the PC host and the wireless mouse.

Figure 3:
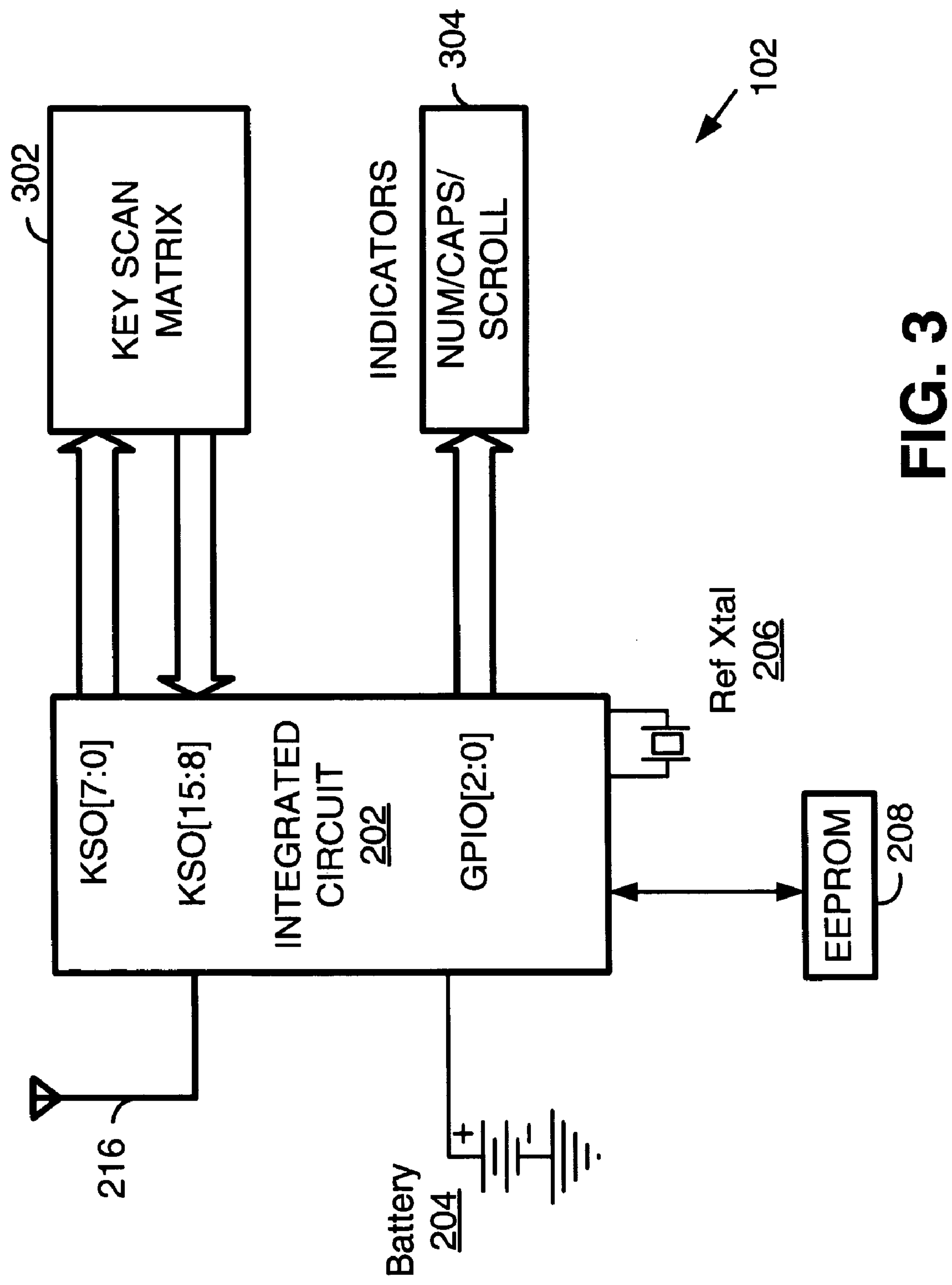
FIG. 3 is a schematic block diagram illustrating the structure of a wireless keyboard that includes a wireless interface device constructed according to the present invention.

FIG. 3 is a schematic block diagram illustrating the structure of a wireless keyboard 102 that includes a wireless interface device (integrated circuit 202) constructed according to the present invention. As shown in FIG. 3, integrated circuit 202 services a key scan matrix 302 that provides inputs from the wireless keyboard. Indicators 304 include num-lock, caps-lock, and scroll-lock indicator lights that are lit on the wireless keyboard. The integrated circuit 202 couples to a battery 204, a crystal 206, an EEPROM 208, and an antenna 216.

In another embodiment (not shown in either FIG. 2 or FIG. 3), the integrated circuit 202 services both wireless mouse and wireless keyboard input and may reside internal to either the wireless mouse of the wireless keyboard. As is relatively apparent to the reader, because the input signals differ, multiplexing or signal sharing may be required. However, different signal lines may be dedicated for wireless keyboard and for wireless mouse inputs such that no signal sharing is required. As is apparent, when the integrated circuit 202 alone services both wireless mouse and wireless keyboard input wired connectivity between the wireless keyboard and the wireless mouse is required.

Figure 4:
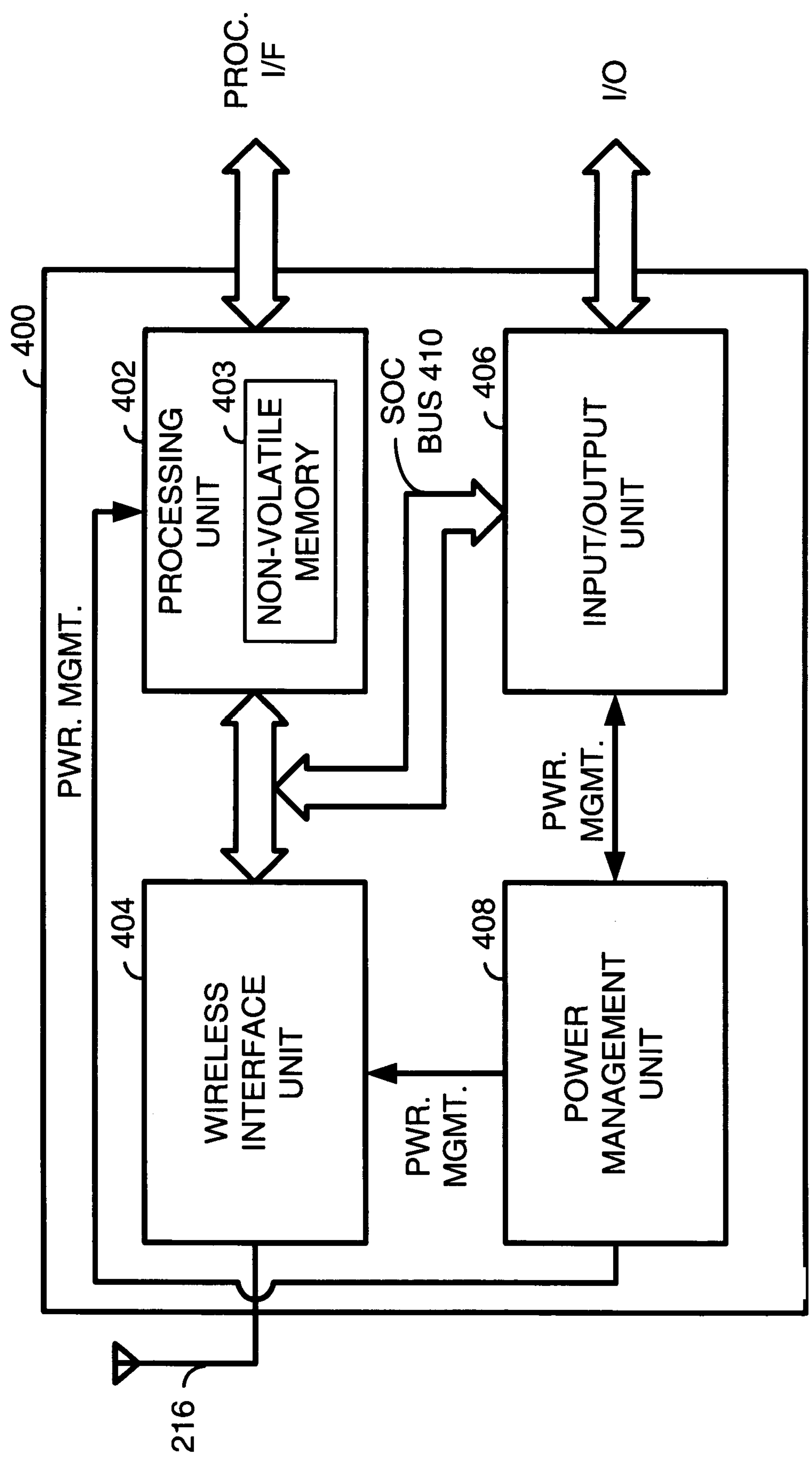
FIG. 4 is a block diagram illustrating a wireless interface device (integrated circuit) constructed according to the present invention.

FIG. 4 is a block diagram illustrating a wireless interface device (integrated circuit) constructed according to the present invention that services a wireless user input device, such as a wireless mouse or a wireless keyboard (or wirelessly enabled printer, wirelessly enabled camera, or wirelessly enabled game controller). As shown in FIG. 4, the wireless interface device 400 includes a processing unit 402, a wireless interface unit 404, an input/output unit 406, and a power management unit 408. The wireless interface unit 404 couples the wireless interface device 400 to antenna 216. The wireless interface unit 404 operates according to the Bluetooth specification and in particular to the Human Interface Device (HID) portion of the Bluetooth specification.

Figure 5:
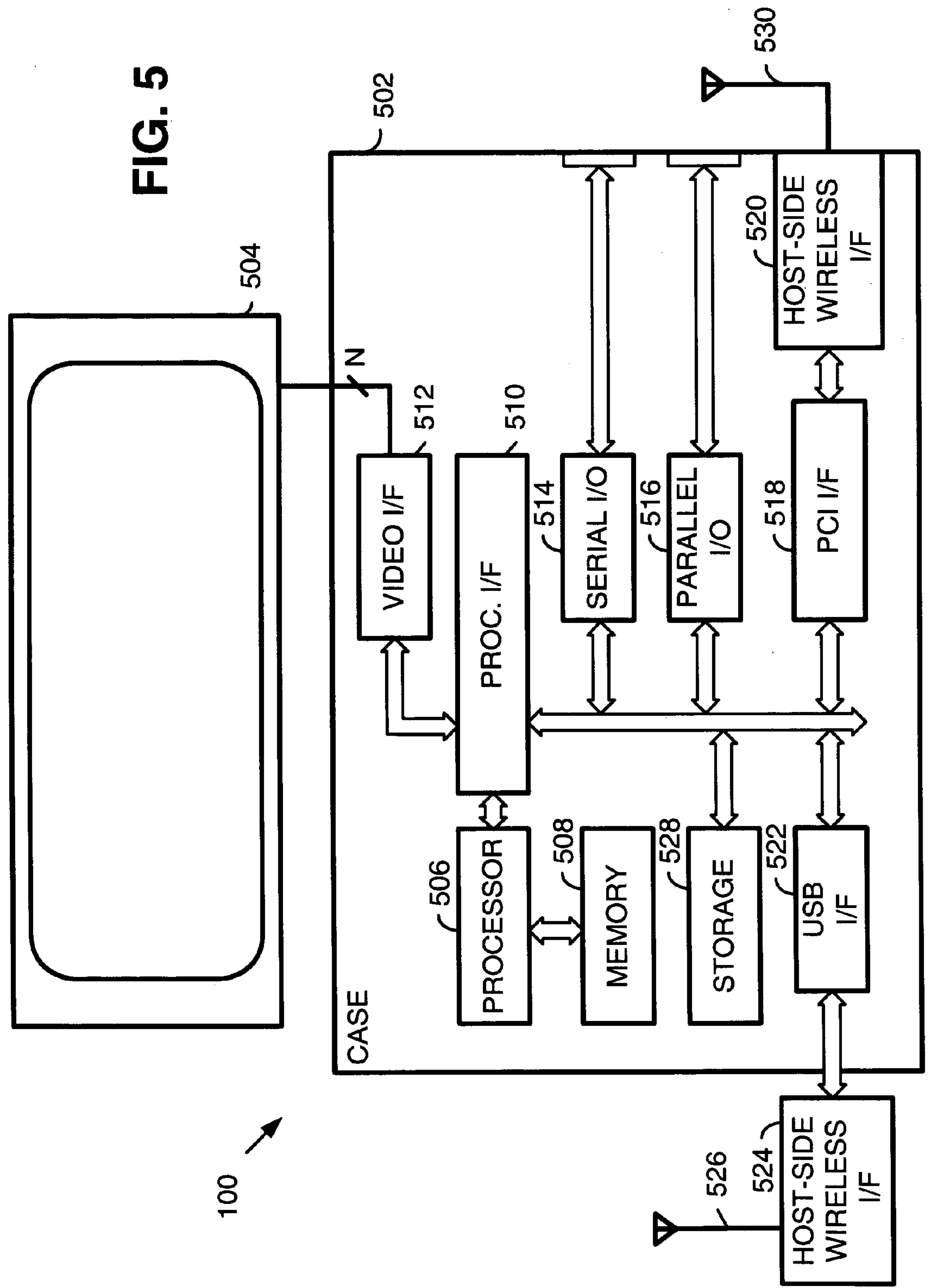
FIG. 5 is a block diagram illustrating a host computer containing a host-side wireless interface constructed according to the present invention.

Processing unit 402, wireless interface unit 404, and input/output unit 406 couple with one another via a system on chip (SOC) bus 410. Processing unit 402 includes a processing interface that may be used to couple the processing unit to one or more devices devices. Input/output unit 406 includes an input/output set of signal lines that couple the wireless interface device 400 to at least one user input device, e.g., wireless keyboard and/or wireless mouse FIG. 5 is a block diagram illustrating a host computer containing a host-side wireless interface constructed according to the present invention. The PC host 100 includes a case 502, a monitor 504, a wireless keyboard 102 such as that shown in FIG. 1 but not shown in FIG. 5, and/or a wireless mouse 104 such as the one shown in FIG. 1 but not shown in FIG. 5. The structure and operation of the monitor 504 is known. Further, the case 502, and the components contained therein are known in both structure and operation, except for the host-side wireless interface of the present invention.

The case 502 includes a mother board upon which are mounted a processor 506, memory 508, a processor interface 510, and a video interface 512. The processor interface 510 interfaces the processor 506 to serial I/O 514, parallel I/O 516, a PCI I/F 518, a Universal Serial Bus (USB) interface 522, and to storage 528, e.g., disk storage, CD-ROM storage, or other storage devices. These components are generally known and will not be described further except as to the manner in which they relate to the present invention.

In a typical embodiment, the PC host 100 includes at least one host-side wireless interface 520 or 524 that services one or more wireless user input devices, e.g., the wireless keyboard 102 and/or the wireless mouse 104. As shown, host-side wireless interface 524 couples to the USB I/F 522 and includes a coupled antenna 526. Further, as shown, host-side wireless interface 520 couples to the PCI I/F 518 and includes a coupled antenna 530. As will be described further with reference to FIGS. 6, 7 and 8, each of the host-side wireless interfaces 520 and 524 services a wireless user input device according to the present invention.

Figure 6:
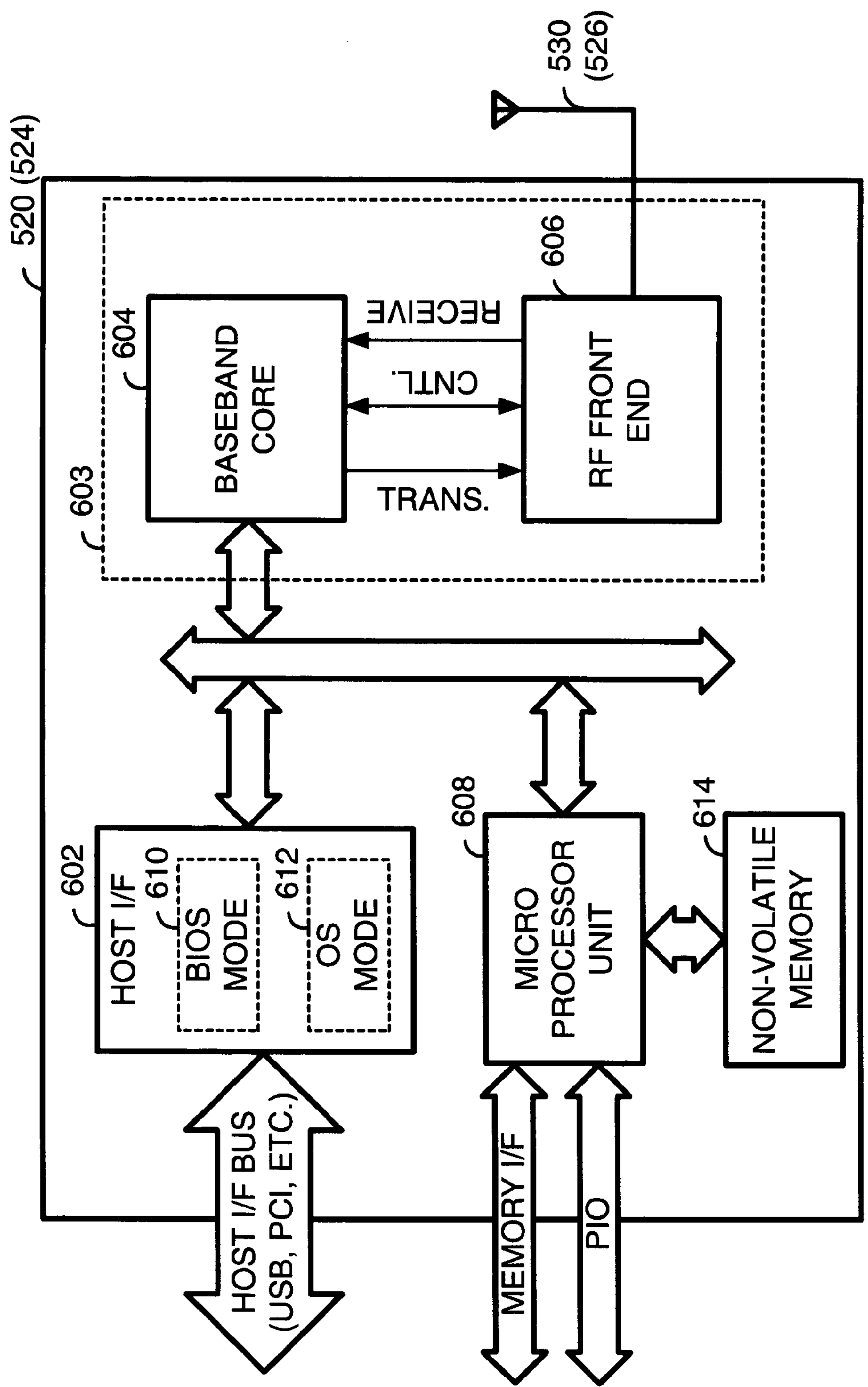
FIG. 6 is a block diagram illustrating a host-side wireless interface constructed according to the present invention.

FIG. 6 is a block diagram illustrating a host-side wireless interface 520 (or 524) constructed according to the present invention. The host-side wireless interface 520 includes a wireless network interface 603, a host interface 602, and may include additional components such as a microprocessor unit 608. The wireless network interface 603 includes a baseband core 604 that operably couples to an RF front end 606 that couples to antenna 530 (or 526). The host interface 602 operably couples to the baseband core 604 and to the microprocessor unit 608. The host interface operably couples to the host via a host interface bus, e.g., USB, PCI bus, etc. The wireless network interface 603 wirelessly communicates with the wireless user input device(s). The microprocessor unit 608 couples to non-volatile memory 614, which may be EPROM, EEPROM, SROM, or another type of non-volatile memory.

When the serviced host initiates bootstrap operations via a Basic Input/Output System (BIOS), the host interface 602 operates in a BIOS host interface mode 610 to allow input from the wireless user input device(s) to the BIOS during the bootstrap operations. Further, when the serviced host initiates Operating System (OS) operations, the host interface operates in an OS host interface mode 612, wherein the OS host interface mode 612 differs from the BIOS host interface mode 610. In this fashion, the user of the wireless user input device(s) might interface with the BIOS during booting operations prior to loading and configuration of the OS. The BIOS host interface mode 610 and the OS host interface mode 612 may be embodied in various manners two of which will be described with reference to FIGS. 7 and 8, respectively.

As will be described more fully with reference to FIGS. 11 and 12, during initial bonding operations between the PC host 100 and a serviced wireless user input device, bonding information is stored by the host-side wireless interface 520 (524) as well as by the PC host 100 in non-volatile memory. This information includes link key information for each serviced wireless user input device, address information for each serviced wireless user input device, and other information required for the host-side wireless interface 520 (524) to interface with the wireless user input devices. These operations allow the host-side wireless interface 520 (524) to interface with the wireless user input devices even when the PC host 100 is running in BIOS host interface mode 610 while the PC host 100 is not supporting Bluetooth HID operations. In effect, the host-side wireless interface 520 (524) causes the wireless user input devices to appear as wired devices, from the perspective of the PC host 100. With wireless operations supported in this manner, during device setup the user may interface with the PC host 100 to interact with the BIOS operating on the host.

Figure 7:
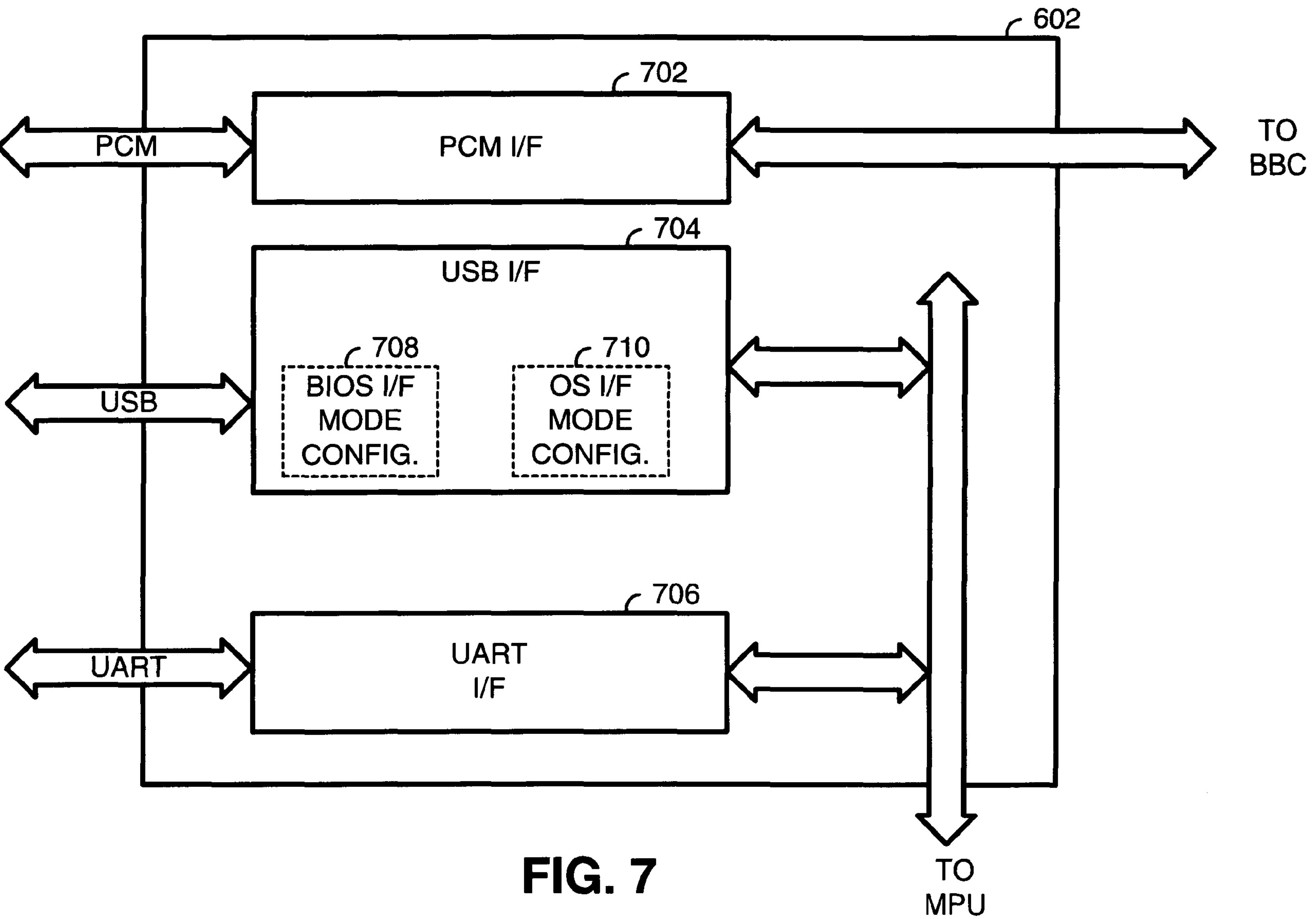
FIG. 7 is a block diagram illustrating in more detail a first embodiment of the host interface of FIG. 6.

FIG. 7 is a block diagram illustrating in more detail a first embodiment of the host interface 602 of FIG. 6. As shown, the host interface 602 includes a PCM I/F 702 that couples the baseband core 604 to a PCM device, e.g., CODE of the serviced host computer. The host interface 602 further includes a USB I/F 704 that operates according to the present invention and a UART I/F 706. The USB I/F 704 couples to a USB of the serviced host computer and to the microprocessor unit 608, as does the UART I/F 706. The structure illustrated in FIG. 7 is illustrative only and is not intended to limit the scope of the present invention.

In the first embodiment of the present invention, as illustrated in FIG. 7, during both the initiation of the BIOS operations and the initiation of the OS operations, the host interface 602 first presents to the serviced host an interface configuration 710 corresponding to the OS host interface mode. Secondly, the host interface 602 presents to the serviced host computer an interface configuration 708 corresponding to the BIOS host interface mode. However, during the bootstrap operations, the BIOS does not recognize the configuration 710 corresponding to the OS host interface mode but does recognizes the configuration 708 corresponding to the BIOS host interface mode. Further, while the OS recognizes both the configuration 710 corresponding to the OS host interface mode and the configuration 708 corresponding to the BIOS host interface mode, the OS selects the first presented configuration 710 corresponding to the OS host interface mode.

With the first embodiment, the configuration 708 corresponding to the BIOS host interface mode comprises a Universal Serial Bus (USB) Human Interface Device (HID) configuration while the configuration 710 corresponding to the OS host interface mode comprises a Bluetooth HID configuration. Thus, while the USB HID configuration will provide a lesser grade of service than the Bluetooth configuration, the configuration is available during bootstrap operations. Further, with this first embodiment, the BIOS may not be Bluetooth aware and, in such case, does not recognize the Bluetooth HID configuration. However, the OS is Bluetooth aware and recognizes the Bluetooth HID configuration.

Figure 8:
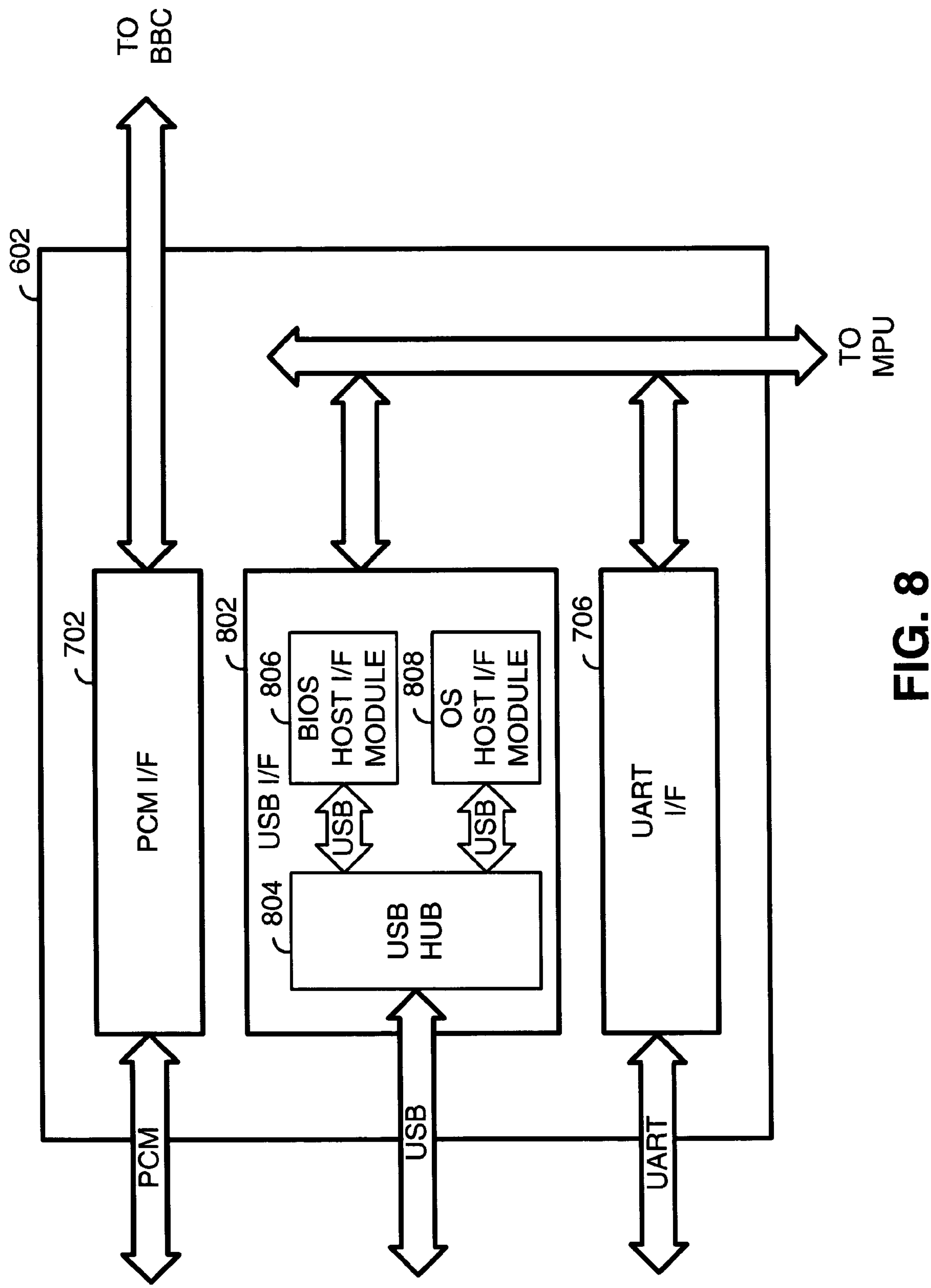
FIG. 8 is a block diagram illustrating in more detail a second embodiment of the host interface of FIG. 6.

FIG. 8 is a block diagram illustrating in more detail a second embodiment of the host interface of FIG. 6. As contrasted to the embodiment of FIG. 7, in the second embodiment, the host interface 602 further includes a USB hub 804 that operably couples to the serviced host via a host interface bus, i.e., USB. The host interface 602 also includes a BIOS host interface module 806 operably coupled to the hub that supports the BIOS host interface mode and an OS host interface module 808 operably coupled to the hub that supports the OS host interface mode. With this embodiment, in the bootstrap operations of the serviced host, the BIOS recognizes the BIOS host interface module 806 but does not recognize the OS host interface module 808. Further, in the OS operations of the serviced host, the OS selects the OS host interface module 808 for servicing. In this embodiment, the BIOS host interface module 806 supports a Universal Serial Bus (USB) Human Interface Device (HID) configuration while the OS host interface module 808 supports a Bluetooth HID configuration.

Figure 9:
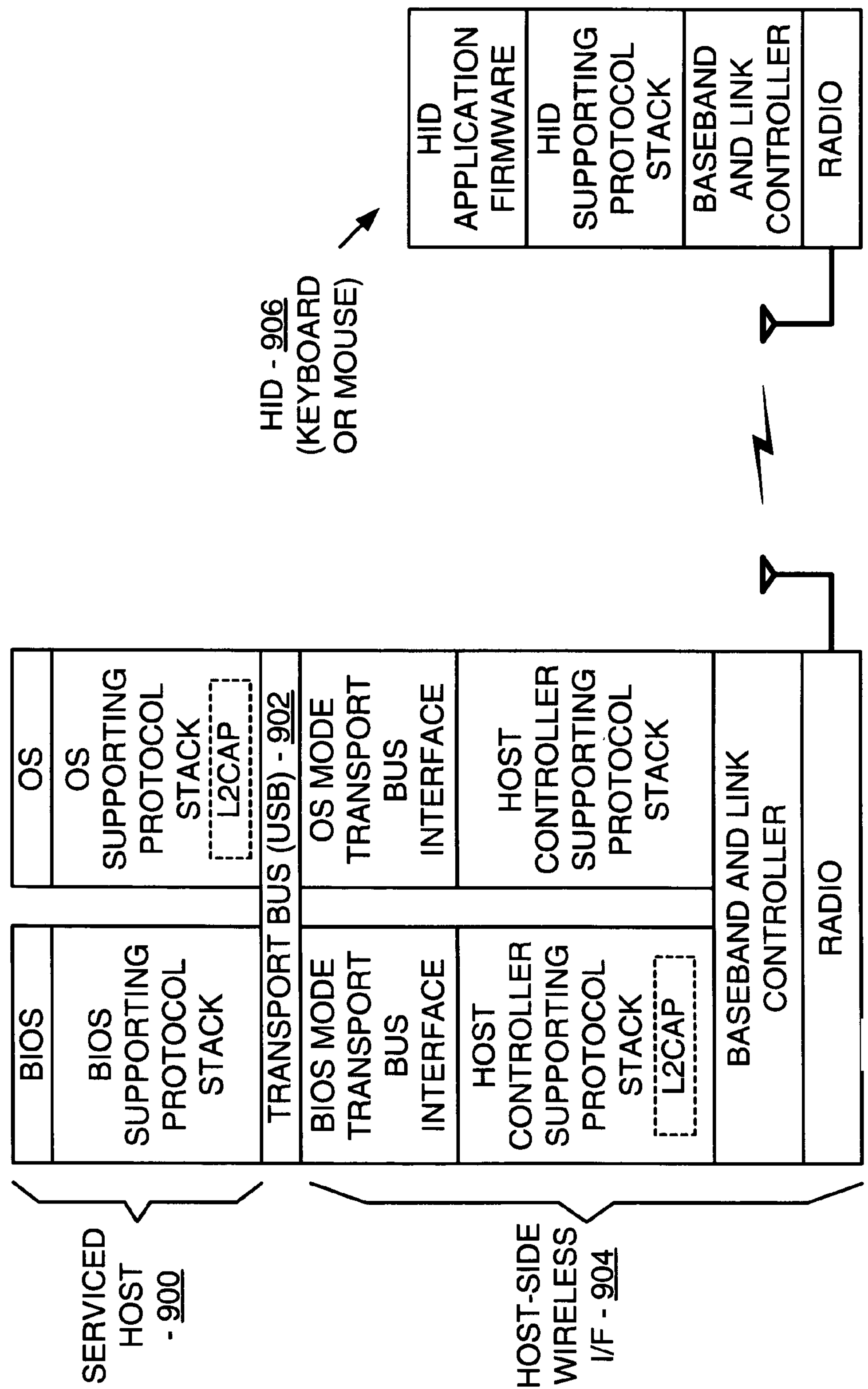
FIG. 9 is a logic diagram illustrating protocol stack(s) supported by a host-side wireless interface constructed according to the present invention.

FIG. 9 is a logic diagram illustrating protocol stack(s) supported by a host-side wireless interface constructed according to the present invention. As illustrated, the serviced host computer 900 runs a BIOS protocol stack that includes the BIOS application and the BIOS supporting protocol stack during boot operations. Further, after the OS is loaded and running on the serviced host computer, the serviced host computer services an OS application that includes an OS supporting protocol stack. Each of the BIOS protocol stack and the OS protocol stack of the serviced host computer 900 interfaces with a host-side wireless interface 904 protocol stack via a transport bus, e.g., a USB 902.

The radio of the host-side wireless interface 904 interfaces with the radio of a wireless user input device 906. The wireless user input device, also referred to as an HID, includes a baseband and link controller, an HID supporting protocol stack, and HID application firmware. Together, these various protocol stack components support operation according to the present invention in allowing a user to use the wireless user input device during both boot operations via the BIOS and during normal operations via the OS, each of which operations on the serviced host computer.

During BIOS host interface mode operations, the host-side wireless interface 904 services a BIOS host interface mode transport bus interface and a host controller supporting protocol stack. In OS host interface mode operations, the host-side wireless interface services an OS host interface mode transport bus interface and a host controller supporting protocol stack. According to one aspect of the present invention relating to the Bluetooth operating standard, in the BIOS host interface mode, the host controller supporting protocol stack of the host-side wireless interface supports the Logical Link Control and Adaptation Protocol (L2CAP) layer. L2CAP is a Bluetooth protocol layer that is responsible for managing the virtual connections between Bluetooth devices and the first level of Asynchronous ConnectionLess (ACL) data flow. Bluetooth Logical Link Control operations create and manage a virtual connection for each I/O task the PC host gives it, e.g., with each supported wireless user input device. By supporting the L2CAP layer in the host controller supporting protocol stack of the host-side wireless interface 904 while in the BIOS host interface mode, wireless user interface devices may interact with the PC host 100 during BIOS operations and when the PC host 100 does not have OS support for Bluetooth HIDs.

Further, according to the present invention, during OS configuration operations, the OS supporting protocol stack supports the L2CAP protocol layer. Such is the case when the OS has support for HIDs. The manner in which the host-side wireless interface 904 and the serviced host 900 each support the L2CAP protocol layer, and how servicing of L2CAP is passed between the host-side wireless interface 520 (524) and the serviced host 900 will be described further with reference to FIGS. 13A, 13B, 14A, and 14B.

Figure 10:
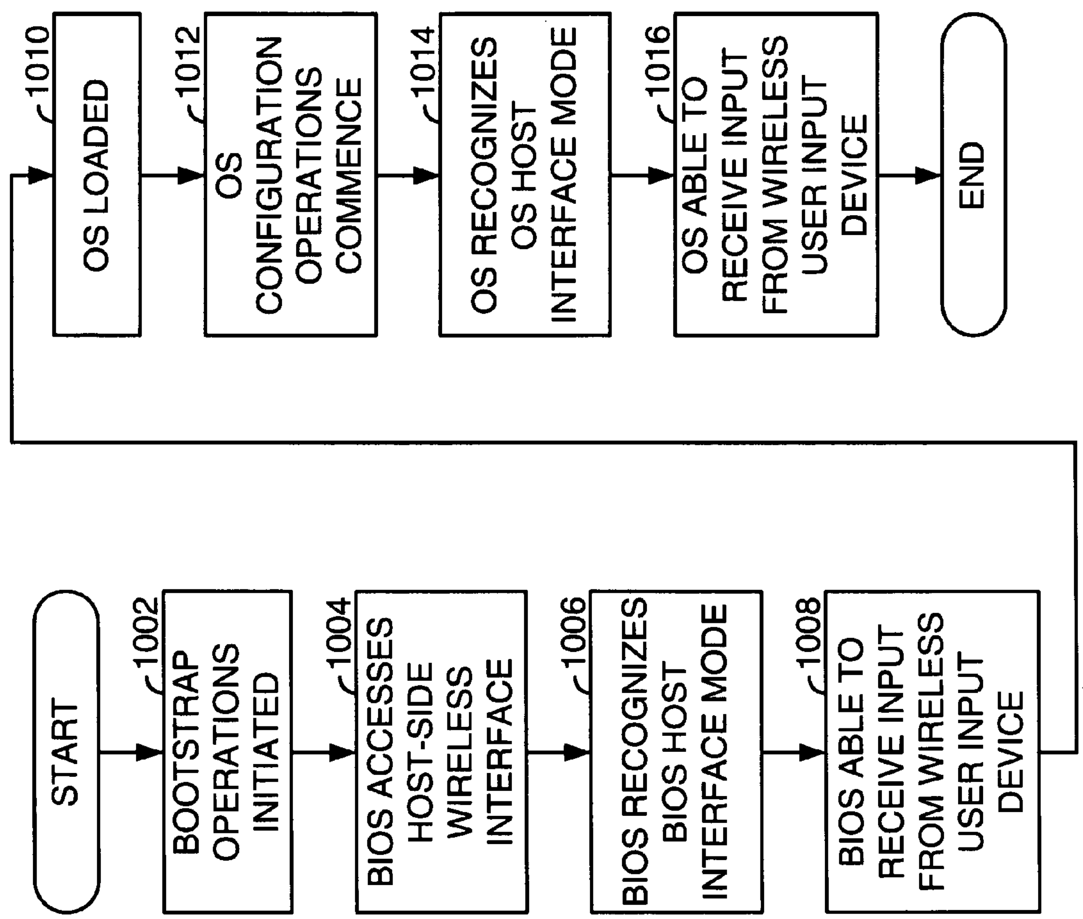
FIG. 10 is a logic diagram illustrating operation according to the present invention in servicing a wireless user input device during startup or reset of the host computer.

FIG. 10 is a logic diagram illustrating operation according to the present invention in servicing a wireless user input device during startup or reset of the host computer. After power up or reset of the serviced host computer, bootstrap operations are initiated (step 1002). As part of the bootstrap operations, the BIOS accesses the host-side wireless interface (step 1004). In accessing the host-side wireless interface, the BIOS recognizes the host-side wireless interface (step 1006). As will be described further with reference to FIG. 13, in BIOS host interface mode, the host-side wireless interface 520 (524) performs link management of the wireless user interface devices.

While the BIOS is running on the PC host, and prior to loading and configuration of the OS, the BIOS is able to receive input from the wireless user input device (step 1008). Next, the OS is loaded (step 1010) and then the OS configuration operations commence (step 1012). During configuration of the OS, the OS recognizes the OS host interface mode of the host-side wireless interface (step 1014) and, after configuration for this mode of operation, the OS is able to receive input from the wireless user input device via the OS host interface mode (1016). From step 1016, operation ends.

Figure 11:
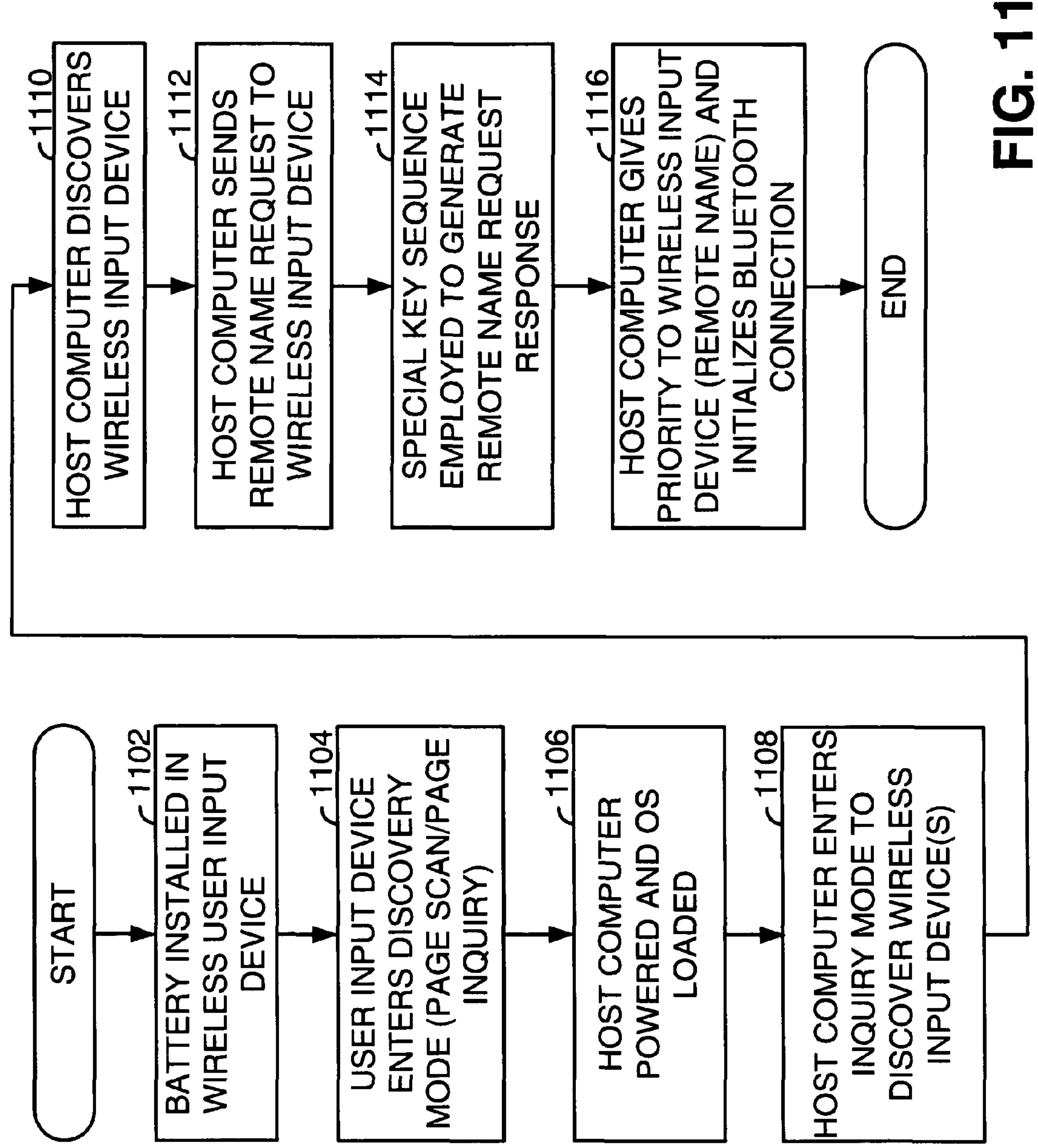
FIG. 11 is a logic diagram illustrating operation according to the present invention in setting up a wireless user input device with a servicing host computer that requires no other input than that of the wireless user input device.

FIG. 11 is a logic diagram illustrating operation according to the present invention in setting up a wireless user input device with a servicing host computer that requires no other input than that of the wireless user input device. The PC host and the wireless user input devices are initially unpaired/unbonded. Bluetooth devices are unpaired when there has been no exchanged link key between the devices. The operations of FIG. 11 cause a pair of unpaired devices to become paired so that they support further operation. A first operation according to the method is powering the wireless user input device, e.g., by installing the battery (step 1102). With the wireless user input device powered, based upon receipt of a configuration input from a user of the wireless user input device, the wireless user input device enters a discovery mode (step 1104).

Then, with the wireless user input device in the discovery mode, the method includes powering the PC host computer and loading the OS (step 1106). The PC host causes the host-side wireless interface to enter an inquiry mode after determining that the PC host supports Bluetooth (or other) operations and that the PC host has not yet bonded with any wireless user input devices (step 1108). The host-side wireless interface of the PC host computer then discovers the wireless user input device (step 1110). The host-side wireless interface of the PC host computer next sends a Remote Name Request to the wireless user input device (step 1112). Based upon receipt of a Remote Name Request user at the wireless user input device, the wireless user inputs a special key sequence and, based upon this special key sequence, the wireless user input device responds to the host-side wireless interface of the PC host computer with a Remote Name Request Response identifying the wireless user input device (step 1114). At step 1114, the special key sequence input by the user of the wireless user input device causes the wireless user input device to respond with a specialized Remote Name Request Response. In one embodiment, the Remote Name Request Response includes a suffix after the regular device name in the Remote Name Request Response. However, in other embodiments, a generic description indicating that the wireless user input device should be give priority by the host-side wireless interface may be employed, e.g., a Class-of-Device indication that identifies the wireless user input device as a Human Input Device.

Finally, the PC host computer performs configuration operations based upon the Remote Name Request Response. In a typical configuration operation based upon the Remote Name Request Response, the PC host performs authentication operations, initializes a connection with the wireless user input device, and may include giving priority to the wireless user input device based upon the Remote Name Request Response (step 1116). According to the pairing operations of the present invention, the Remote Name Request and Response operations may require that a Class of Device (COD) be included by the responding wireless user input device. With this operation in place, the host computer may ignore wireless devices that do not have a COD from a COD group that includes desired wireless user input devices (or other acceptable devices).

Figure 12:
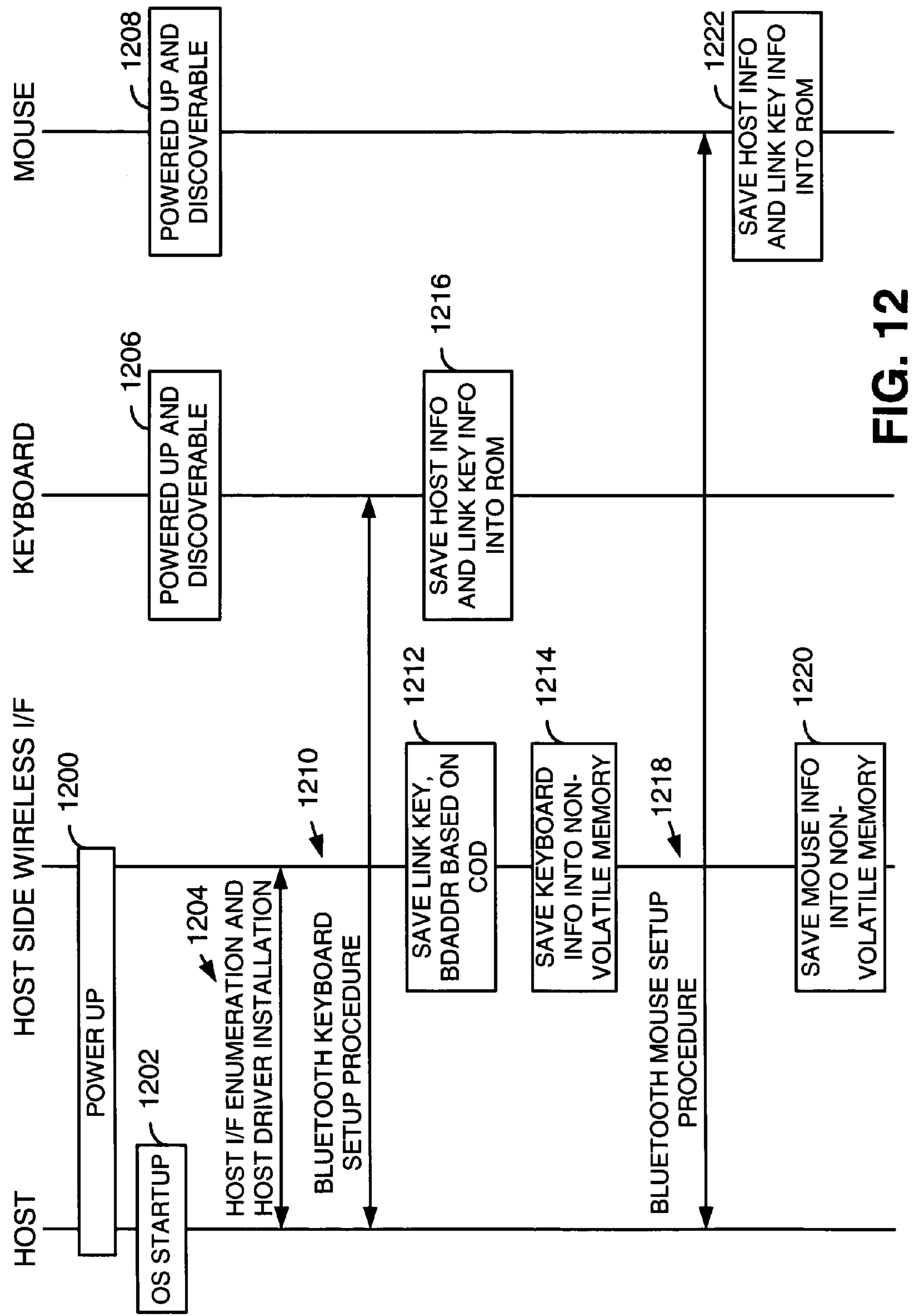
FIG. 12 is operational flow diagram illustrating one particular operation of the present invention in the initial setup of a wireless host, a wireless keyboard, and a wireless mouse.

FIG. 12 is operational flow diagram illustrating one particular operation of the present invention in the initial setup of a wireless host (PC host), a wireless keyboard, and a wireless mouse. As a first operation, the PC host is powered up (step 1200). After power up, the PC host launches its OS and further PC host operations are performed at the command of the OS (step 1202). Next, the PC host performs Interface Enumeration operations (on the USB) and host driver installation (step 1204).

Because the host-side wireless interface is powered by the PC host, the host-side wireless interface is powered with the PC host. Concurrently or non-concurrently with powering the PC host, one or more wireless user input devices is/are powered, e.g., wireless keyboard is powered (step 1206) or wireless mouse is powered (step 1208). Note that the operations of FIGS. 12, 13A, 13B, 14A, and 14B are not limited to the sequence indicated by the numbering. In fact, these various operations could be performed in differing orders or concurrently with one another.

Upon powering up, the wireless keyboard and/or wireless mouse are discoverable such that the devices will respond to an inquiry from the host-side wireless interface (normally in addition to responding to a page). Thus, the PC host via the host-side wireless interface performs Bluetooth wireless keyboard setup procedures to setup the wireless keyboard (step 1210). During these operations, information for the wireless keyboard is received by the host-side wireless interface and passed to the PC host for storage. This information may include a PIN for the wireless keyboard, a link key for the established link, the BD_ADDR for the wireless keyboard, and other information relating to the pairing/bonding of the host-side wireless interface/PC host and the wireless keyboard. According to the present invention, the wireless keyboard (and the wireless mouse at step 1218) may have a special Class of Device (COD) number that identifies the devices as Human Interface Devices (HIDs) during device setup. The CODs will cause the PC host to give the devices priority in being setup. It is contemplated that either the wireless mouse or the wireless keyboard will be give highest priority so that they may be employed in the subsequent setup operations.

Note that the following Bluetooth terminology relates to the processes of the present invention and is provided herein for additional reference:

The operations of FIG. 12 are referred to as "Bonding." Bonding is a dedicated procedure for performing the first authentication between Bluetooth devices, where a common link key is created and stored for future use.

An unknown device is a Bluetooth device for which no information (BD_ADDR, link key, PIN, or other) is stored. Prior to the operations of FIG. 12, the PC host, the wireless keyboard, and the wireless mouse are unknown to one another. In this state, the devices are not yet bonded and are unknown to one another.

A known device is a Bluetooth device for which at least the BD_ADDR is stored.

During setup, the PC host will learn the BD_ADDR of the wireless keyboard and the wireless mouse. Both the PC host and the host-side wireless interface may store the BD_ADDR of each serviced wireless interface device, i.e., wireless keyboard, wireless mouse, camera, printer, game controller, etc. as well as additional information relating to the bonding of the devices.

An authenticated device is a Bluetooth device whose identity has been verified during the lifetime of the current link, based on the authentication procedure. At step 1210, the wireless keyboard is authenticated by the PC host in addition to being set up.

A trusted relationship is created when a remote device is marked as a trusted device. This includes storing a common link key for future authentication and pairing (if the link key is not available). During the setup procedure at step 1210, the wireless keyboard may be marked as a trusted device.

After the setup procedure of step 1210 has been completed, the link key, the BD_ADDR (which is based upon the COD of the wireless keyboard), and other configuration information are stored in non-volatile memory 614 of the host-side wireless interface 520 (524) (step 1212). This information was previously stored in the PC host at step 1210 during the Bluetooth wireless keyboard setup procedure. The wireless keyboard also saves host information and link key information into its non-volatile memory 403 (step 1216). Additionally, the host-side wireless interface saves the configuration information of the wireless keyboard in its non-volatile memory 614 for subsequent use (step 1214). As will be described further with reference to FIG. 13A and FIG. 13B, and as was described with reference to FIG. 9, in BIOS host interface mode, the host-side wireless interface must support most (if not all) Bluetooth protocol operations, some of which require the configuration information that was gathered during the operations of FIG. 12. In BIOS host interface mode, the configuration information is not available from the PC host and thus, the host-side wireless interface must locally store such information so that it is available.

The setup procedure between the PC host and the wireless mouse is next performed (step 1218). This procedure is the same/similar to the setup of the wireless keyboard of step 1210 and results in bonding of the wireless mouse to the PC host. The wireless mouse then saves host information and link key information into its non-volatile memory (step 1222). The information stored by the wireless mouse is the same/similar information as was saved at step 1216 by the wireless keyboard. Further, the host-side wireless interface saves the wireless mouse information into its non-volatile memory (step 1220). The information stored for the wireless mouse is the same type of information as was stored for the wireless keyboard at steps 1212 and 1214.

Figure 13A:
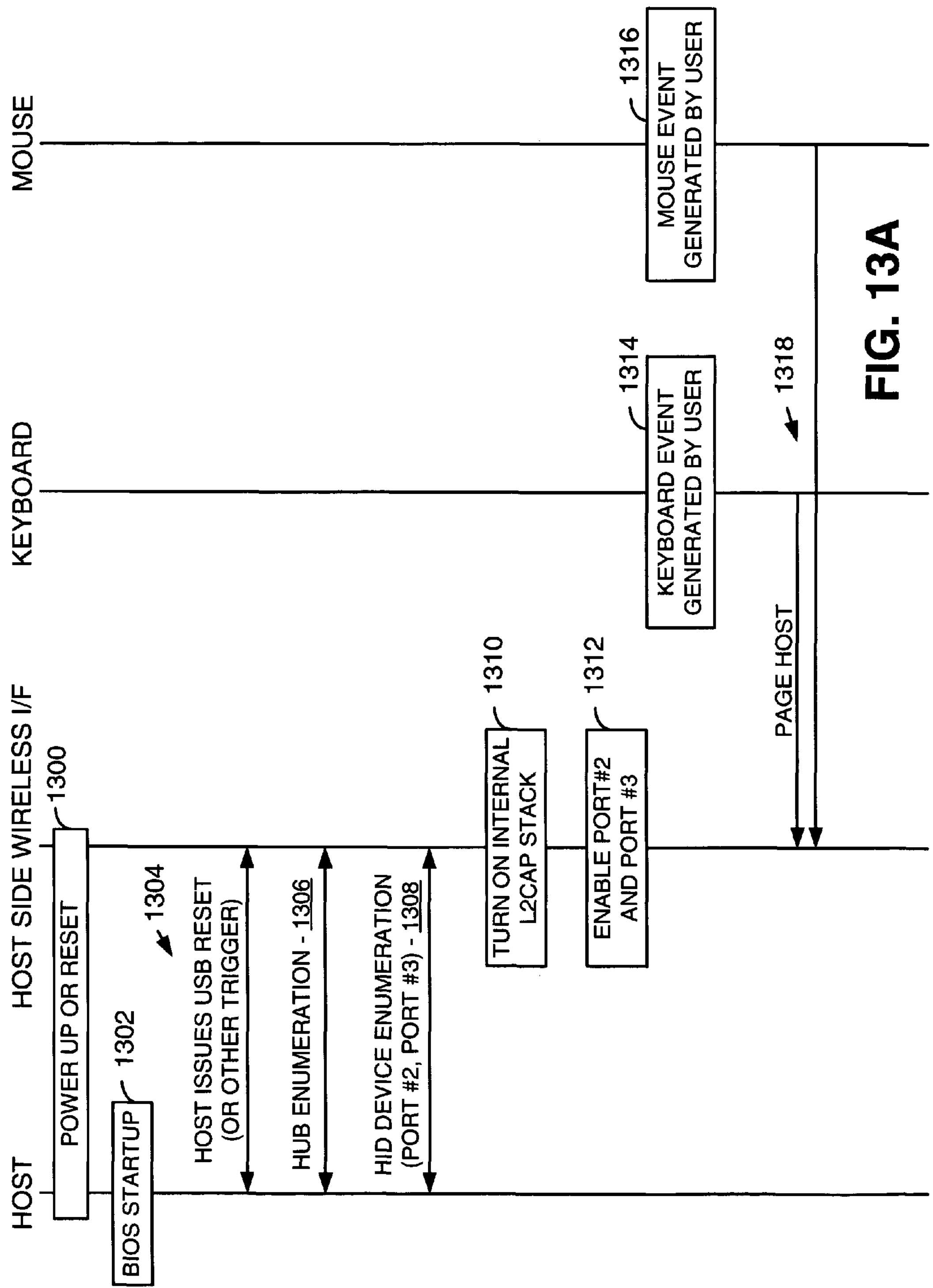
FIGS. 13A and 13B are operational flow diagrams illustrating operation according to the present invention in initiating a BIOS host interface mode of operation to service communications between a host computer, a wireless keyboard, and a wireless mouse.
Figure 13B:
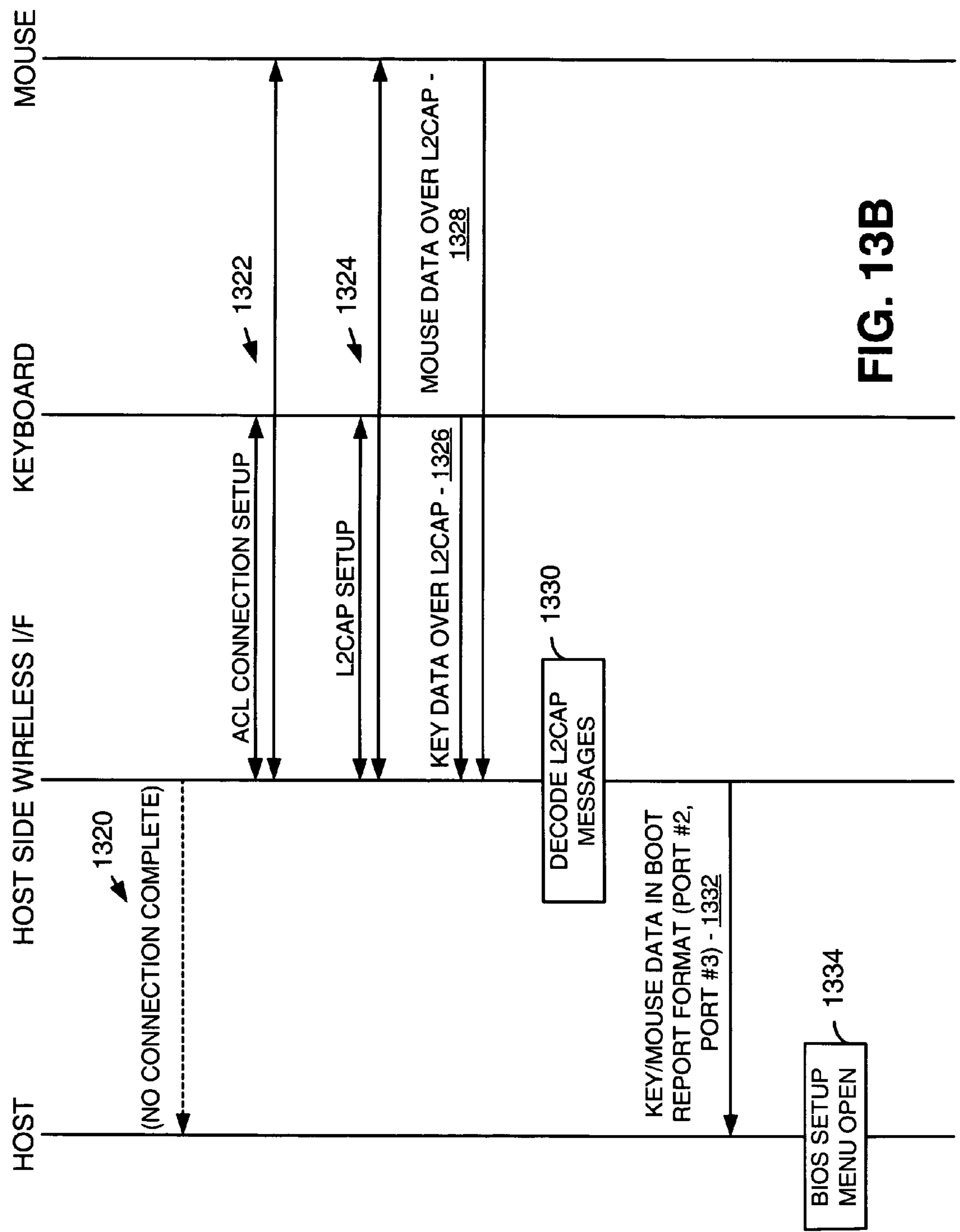

FIGS. 13A and 13B are operational flow diagrams illustrating operation according to the present invention in initiating a BIOS host interface mode of operation to service communications between a host computer, a wireless keyboard, and a wireless mouse. The operations of FIGS. 13A, 13B, 14A, and 14B are described in a particular order. This particular order may or may not be the order of the operations described as these operations may occur in differing orders.

On a power up or reset operation (step 1300), the PC host initiates BIOS startup (step 1302). The PC host then issues a USB reset or other trigger, which the host side wireless interface receives (step 1304). On the PC host-side, the PC host performs hub enumeration with the host-side wireless interface (step 1306). With the host-side wireless interface supporting BIOS host interface mode, HID enumeration is performed for the ports serviced by the host-side wireless interface, e.g., port #2 for the wireless keyboard, port #3 for the wireless mouse, etc. (step 1308). The host-side wireless interface then turns on its internal L2CAP protocol stack (step 1310) and enables port #2 and port #3 to support the wireless keyboard and the wireless mouse, respectively (step 1312).

During the BIOS startup (or thereafter) the wireless keyboard or wireless mouse generates an event, i.e., keystroke(s), cursor movement, wireless mouse click, etc. (step 1314 and/or step 1316). In response thereto, the wireless keyboard/wireless mouse pages the host (step 1318). However, the host-side wireless interface cannot complete a connection of the page to the PC host (step 1320). Thus, the host-side wireless interface performs ACL connection setup with the wireless keyboard/wireless mouse (step 1322). Further, because in the BIOS host interface mode the host-side wireless interface supports the L2CAP protocol layer, it performs L2CAP setup with the wireless keyboard/wireless mouse (step 1324). The host-side wireless interface receives input data from the wireless keyboard (step 1326), e.g., CTRL-ALT-DEL, and input data from the wireless mouse (step 1328) via the L2CAP protocol layer.

The host-side wireless interface then decodes the L2CAP messages from the wireless keyboard/wireless mouse (step 1330) and reports the information contained therein to the PC host in a boot mode report format (step 1332), which causes the PC host to initiate BIOS setup operations. The BIOS setup menu is then presented to the user (step 1334).

Figure 14A:
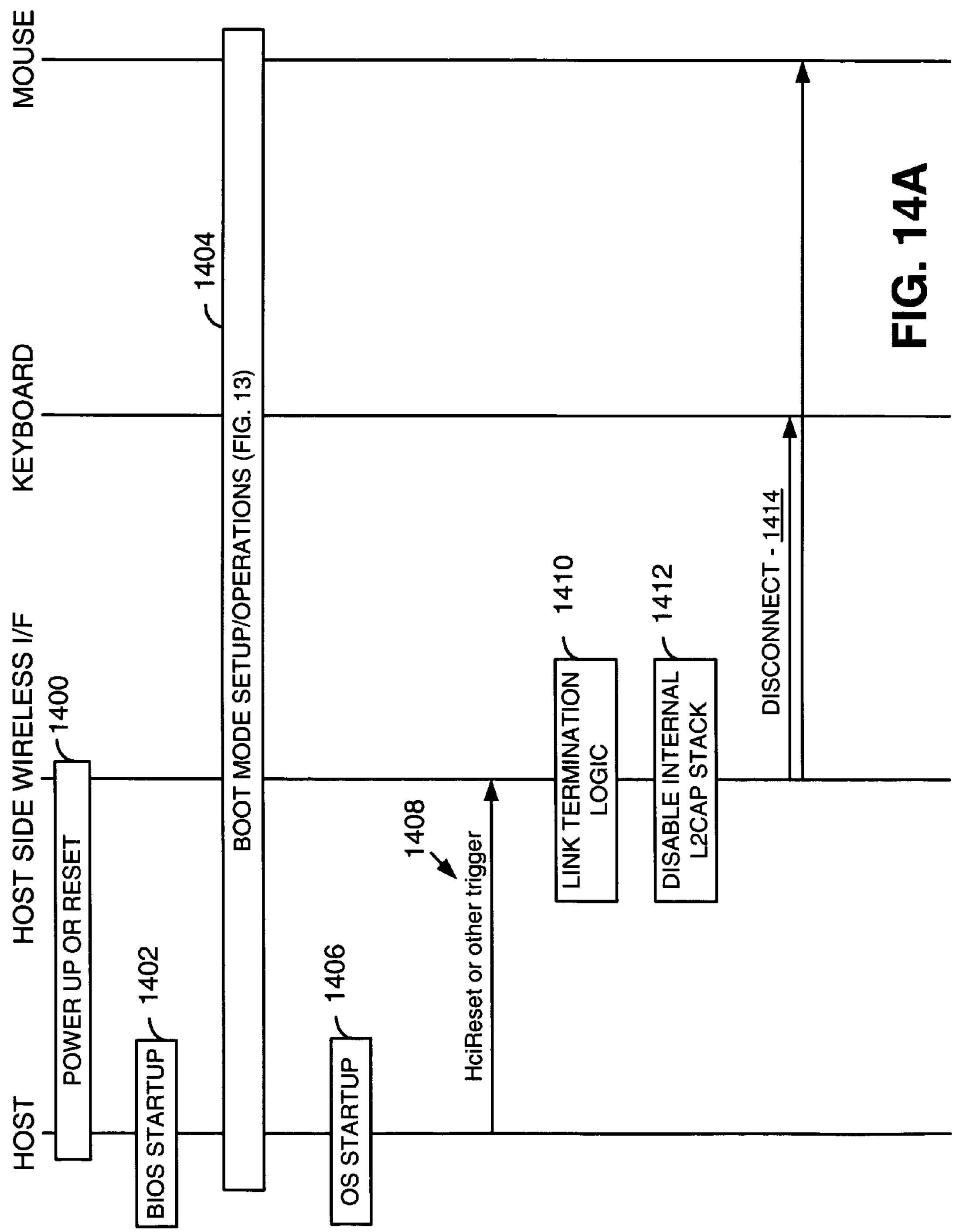
FIGS. 14A and 14B are operational flow diagrams illustrating operation according to the present invention in transitioning from a BIOS host interface mode of operation to an OS host interface mode of operation to service communications between the host computer, the wireless keyboard, and the wireless mouse.
Figure 14B:
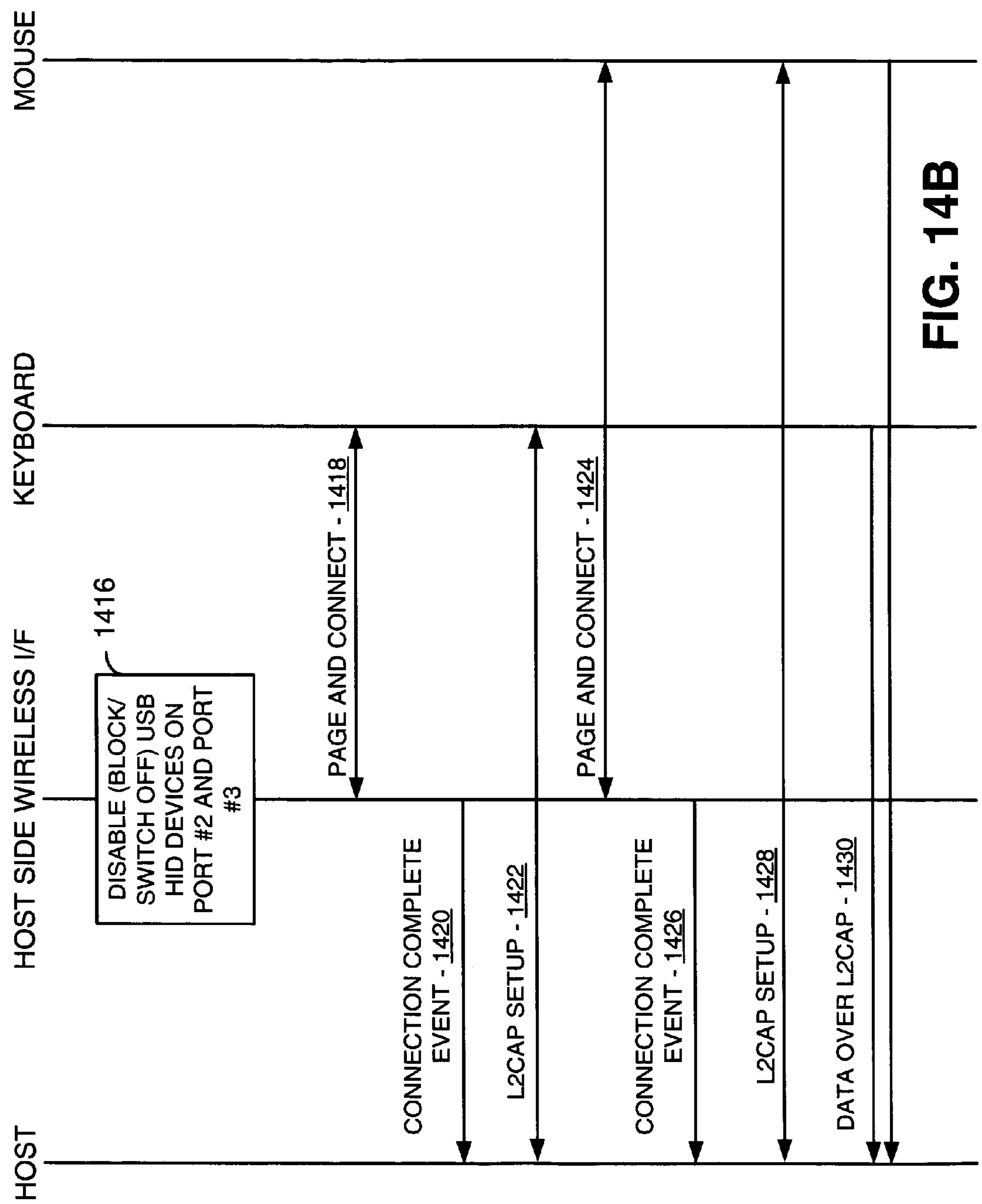

FIGS. 14A and 14B are operational flow diagrams illustrating operation according to the present invention in transitioning from a BIOS host interface mode of operation to an OS host interface mode of operation to service communications between the host computer, the wireless keyboard, and the wireless mouse. Operation commences on power up or reset (step 1400) with the host PC starting its BIOS (step 1402). The devices next perform boot mode setup/operations as was described with reference to FIGS. 13A/13B (step 1404). The PC host next performs OS setup (step 1406) and the OS issues a HciReset command (or other trigger) via the USB to the host-side wireless interface (step 1408).

Based upon this HciReset command the host-side wireless interface executes logic to determine whether to transition from non-boot to boot logic (step 1410). If the logic dictates a transition from non-boot to boot logic, the host-side wireless interface disables its internal L2CAP protocol stack (step 1412). The host-side wireless interface then disconnects the links that it has with the wireless keyboard and/or the wireless mouse (step 1414). The host-side wireless interface then disables (blocks or switches off) the USB HID devices on port #2 and port #3, the wireless keyboard and wireless mouse, respectively (step 1416).

No activity occurs until the wireless keyboard receives user input and initiates a connection procedure (step 1418). Upon completion of the connection event, the host-side wireless interface interacts with the PC host to indicate the completion of the connection event (step 1420). In response thereto, the PC host, via the host-side wireless interface, performs L2CAP setup (step 1422). As the reader will recall from FIG. 9, in the OS host interface mode of operation, the L2CAP protocol is implemented upon the PC host. These same events (steps 1418 through 1422) are performed for the wireless mouse at steps 1424 through 1428. With these events completed, data is transferred from the wireless keyboard and/or host to the PC host via L2CAP operations (step 1430).

The invention disclosed herein is susceptible to various modifications and alternative forms. Specific embodiments therefore have been shown by way of example in the drawings and detailed description. It should be understood, however, that the drawings and detailed description thereto are not intended to limit the invention to the particular form disclosed, but on the contrary, the invention is to cover all modifications, equivalents and alternatives falling within the spirit and scope of the present invention as defined by the claims.

The invention claimed is:

1. A host-side wireless interface that services a host computer and at least one wireless user input device, the host-side wireless interface comprising:

- a host interface that operably couples to the host computer;
- a processing unit operably coupled to the host interface;
- a non-volatile memory operably coupled to the processing unit;
- a wireless network interface operably coupled to the processing unit and to the host interface that wirelessly couples the host-side wireless interface to the least one wireless user input device;

wherein during a configuration operation, the host-side wireless interface sends a Remote Name Request to the at least one wireless user input device and configuration information from the at least one wireless user input device is stored in the non-volatile memory and is also transferred to the host computer via the host interface; and wherein during a subsequent boot mode operation, the configuration information is retrieved from the non-volatile memory and used in servicing the at least one wireless user input device.

2. The host-side wireless interface of claim 1, wherein during configuration operations the host-side wireless interface gives priority to a wireless user input device based upon a Remote Name Request Response it receives from the wireless user input device.

3. The host-side wireless interface of claim 1, wherein the host interface is a Universal Serial Bus (USB) interface.

4. The host-side wireless interface of claim 1, wherein the host-side wireless interface is a Bluetooth interface.

5. The host-side wireless interface of claim 1, wherein the at least one wireless user input device is selected from the group consisting of wireless mouse, wireless keyboard, and wireless game controller.

6. The host-side wireless interface of claim 1, wherein during configuration operations, the host-side wireless interface gives priority to a responding wireless user input device based upon a received Class-of-Device indication.

7. The host-side wireless interface of claim 1, wherein the configuration information includes at least one of an address of the wireless user input device and a link key.

8. A computer system comprising:

a host computer;

at least one wireless user input device; and a host-side wireless interface that includes:

a host interface that operably couples to the host computer;

a processing unit operably coupled to the host interface;

a non-volatile memory operably coupled to the processing unit; and a wireless network interface operably coupled to the processing unit and to the host interface that wirelessly couples the host-side wireless interface to the least one wireless user input device;

wherein during a configuration operation, the host-side wireless interface sends a Remote Name Request to the at least one wireless user input device and configuration information from the at least one wireless user input device is stored in the non-volatile memory and is also transferred to the host computer via the host interface; and wherein during a subsequent boot mode operation, the configuration information is retrieved from the non-volatile memory and used in servicing the at least one wireless user input device.

9. The computer system of claim 8, wherein during configuration operations the host-side wireless interface gives priority to a wireless user input device based upon a Remote Name Request Response it receives from the wireless user input device.

10. The computer system of claim 8, wherein the host interface is a Universal Serial Bus interface.

11. The computer system of claim 8, wherein the host-side wireless interface is a Bluetooth interface.

12. The computer system of claim 8, wherein the at least one wireless user input device is selected from the group consisting of wireless mouse, wireless keyboard, and wireless game controller.

13. The computer system of claim 8, wherein during configuration operations, the host-side wireless interface gives priority to a responding wireless user input device based upon a received Class-of-Device indication.

14. The computer system of claim 8, wherein the configuration information includes at least one of an address of the wireless user input device and a link key.

* * * * *